Aug. 20, 1929.  E. BRILLIÉ  1,724,991
COUPLING OF LOCOMOTIVE AXLES
Filed July 8, 1927   2 Sheets-Sheet 1

Aug. 20, 1929.  E. BRILLIÉ  1,724,991

COUPLING OF LOCOMOTIVE AXLES

Filed July 8, 1927   2 Sheets-Sheet 2

E. Brillié
INVENTOR

By Marks & Clerk
Attys.

Patented Aug. 20, 1929.

1,724,991

UNITED STATES PATENT OFFICE.

EUGENE BRILLIÉ, OF PARIS, FRANCE.

COUPLING OF LOCOMOTIVE AXLES.

Application filed July 8, 1927, Serial No. 204,392, and in France July 13, 1926.

The present invention relates to locomotives in which the motors (internal combustion or other engines), four or six groups in number, drive two axles, either directly or through the medium of rocking levers.

Figure 1:
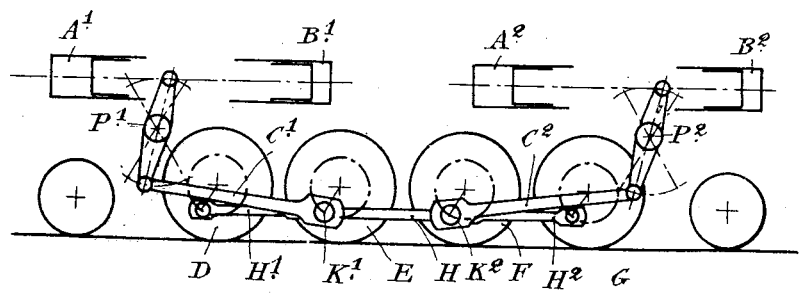
Figure 1 shows a machine of this type in which the coupling rod linkage is connected under ordinary conditions.

Fig. 1 shows an example of this type of machine, assumed to be equipped with four motive groups, two on the right and two on the left, the drive of the axles being effected by four rocking levers. Each group comprises either a double acting cylinder, or two single acting (two stroke cylinders $A^1$ $B^1$, or two twin four stroke cylinders, for example. One of the groups $A^1$ $B^1$ drives by a rocking lever $P^1$ and a connecting rod $C^1$ a mounted axle E, and the other group $A^2$ $B^2$ drives by a rocking lever $P^2$ and connecting rod $C^2$, a mounted axle F.

As hitherto arranged, the two axles E and F are connected together and with the other coupled axles by coupling rods H $H^1$ $H^2$ etc. articulated on the driving crank pins $K^1$, $K^2$.

The same arrangement is present on the other side of the machine, the cranks on the right hand side and on the left hand side being keyed 90° apart.

From this arrangement it results that on the one hand the driving efforts are exerted in unison in the cylinders $A^1$ and $A^2$, $B^1$ and $B^2$, on the other hand that the reciprocating parts on the same side of the machine are displaced in the same direction for the two groups, and that their disturbing effects are superposed.

Figure 2:
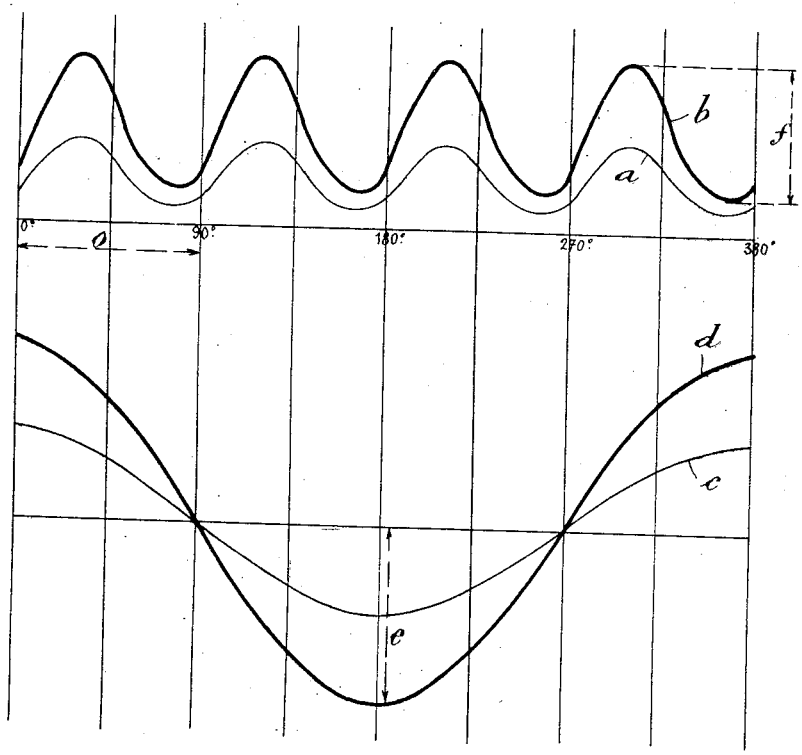
Figure 2 is a diagram showing the nature of the driving forces and forces of inertia with such arrangement.

This is shown in the graphs of Fig. 2 in which the development of one turn of a wheel is plotted along the abscissæ.

The curve $a$ represents, in ordinates, the driving couple, or tractive effort, resulting from the front motive groups (4 cylinders) of the machine (the amplitude of this curve corresponds to the action of engines on the two-stroke Diesel cycle).

The rear motive groups having their phases in unison with those of the front groups, their motive couple will be represented by the same curve $a$.

The resultant couple is a curve $b$ the ordinates of which are double those of $a$. A curve is presented showing a high coefficient of irregularity, that is to say very unfavourable from the point of view of adhesion. The resultant irregularity of the tractive effort is indicated by $f$ in Fig. 2.

The curve $c$ represents, for one turn of a wheel, the effects of inertia of the reciprocating parts of the left hand side front group, corresponding to the cylinders $A^1$ $B^1$. The effects of inertia of the left rear group (cylinders $A^2$ $B^2$) being the same and in unison, the resultant of the forces of the two groups on the same side is a curve $d$, the ordinates of which are double the curve $c$, the irregularity being represented by $e$.

It results therefore that the arrangement according to Fig. 1 leads to a very irregular driving couple and to considerable disturbing effects due to the inertia of the reciprocating parts.

The subject of the invention consists in an arrangement for coupling the axles which enables by a suitable angular displacement of the front and rear motors, the driving effort to be rendered uniform and the effects of inertia to be partially compensated.

Figure 3:
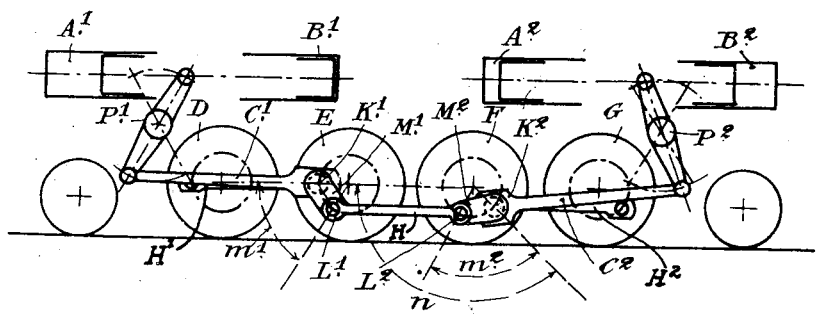
Figure 3 shows a machine of the same type with the coupling rod linkage forming the subject matter of the present invention.

The arrangement is shown in elevation in Fig. 3.

Figure 4:
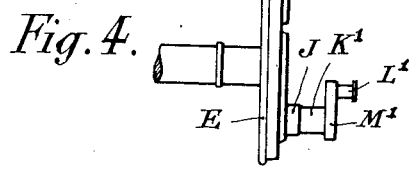
Figure 4 shows the detail of the counter-crank.

Fig. 4 shows an edge view of the driving wheel with its crank pins.

Figure 5:
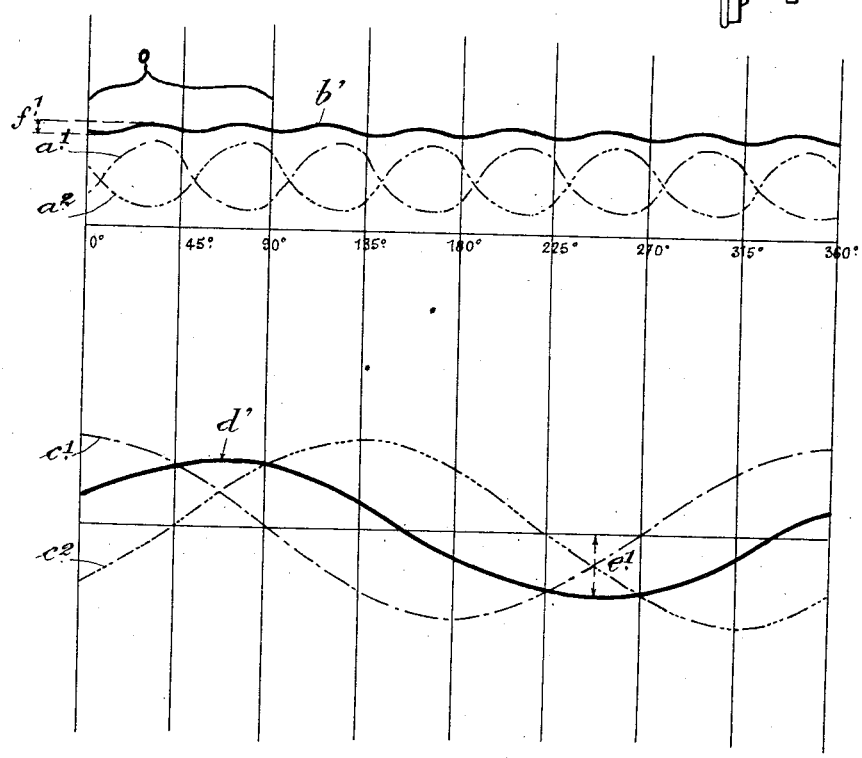
Figure 5 is a diagram comparative with that of Figure 2, for the coupling rod linkage according to Figure 3.

Fig. 5 gives the curves of the driving couples and of the inertia effects corresponding to this arrangement.

The driving crank pins $K^1$ $K^2$ of the driving wheels E and F are provided with counter cranks $M^1$ $M^2$, the pins of which $L^1$ $L^2$ are intercoupled by the coupling rod H, whereas the wheels D G are respectively coupled with the wheels E F by the coupling rods $H^1$ and $H^2$, articulated as in Fig. 1 on the bosses J (Fig. 4) concentric with the crank pins $K^1$ $K^2$.

The angular relationship $m^1$, between the crank pins $K^1$ and $L^1$, $m^2$ between $K^2$ and $L^2$, is so determined that the angle $n$ formed by the crank pin $K^2$ of the rear group relatively to the crank pin $K^1$ of the front group is 180° less a semi-phase, the phase being defined by the angle $o$ corresponding to two successive impulses of the front or rear engines, this being, with the example under consideration (four motive groups) of 180°−45°=135°. If the same length is given to the counter cranks $M^1$ and $M^2$, this will give $m^1=m^2=67\frac{1}{2}°$.

Under these conditions, on reference to Fig. 5, as far as the motive couple is concerned, will be obtained:—

The curve $a^1$ (the same as $a$ Fig. 2) relates to the two front groups (4 cylinders).

The curve $a^2$ concerning the two rear groups, is the same as $a^1$ displaced by a phase and a half, or what comes to the same thing by a semi-phase, that is to say 45°.

It is seen that the resultant curve $b^1$ (sum of $a^1$ and $a^2$) presents a regularity approximately absolute (irregularity $f^1$).

As regards the effects of inertia:—

The curve $c^1$ (the same as $c$) relates to the left front group; the curve $c^2$ (displaced by a phase and a half that is to say 135° relatively to $b$,) concerns the left rear group. The resultant will be a curve $d^1$ in which the maximum ordinate $e^1$ represents about a third of the ordinate $e$ of Fig. 2.

From this results an almost absolute regularity of the tractive effort and a considerable reduction (in the ratio of 3 to 1) of the disturbing effects due to inertia.

If the machine had six motive groups, four lateral groups and two axial groups, with middle right and left cranks keyed respectively 120° apart, the optimum angle $n$ would be 180−30=150°.

The invention remains the same, if the angle $n$ is modified in order, for example, to improve the balancing to the detriment of the regularity of the motive couple; if the connecting rods $c^1$ $c^2$ are directly actuated by a piston instead of the intermediary of rocking levers; if the linkage on counter cranks connects the coupled axles instead of the driving axles, in the case where the extreme axles would be drivers, for example, or if a coupled axle and a driving axle are interconnected; and if the motive agent is other than the action of internal combustion, etc.

Claim:

In a driving mechanism for locomotives, two groups of driving cylinders, a front group and a rear group, two driving axles with driving crank pins, driving rods interposed between said groups of driving cylinders and the driving crank pins and operating the driving axles respectively, counter-cranks mounted at the end of the driving crank pins, a connecting rod uniting the pins of the counter-cranks, each pin of the counter-cranks forming with its corresponding driving crank pin an angle such as the resultant angular position of the two driving crank pins relatively to each other is equivalent to 180° less half of the angle which separates two successive driving strokes of the two driving groups taken separately.

In testimony whereof I affix my signature.

EUGENE BRILLIÉ.